Sept. 26, 1961 J. A. BALDWIN, JR., ET AL 3,002,067

MAGNETICALLY BIASED SWITCH

Filed July 1, 1959

INVENTORS: J. A. BALDWIN JR.
A. FEINER

BY Henry M. Bissell

ATTORNEY 3,002,067

Patented Sept. 26, 1961

United States Patent Office 3,002,067

MAGNETICALLY BIASED SWITCH

John A. Baldwin, Jr., Murray Hill, and Alexander Feiner, Whippany, N.J., assignors to Bell Telephone Laboratories, Incorporated, New York, N.Y., a corporation of New York Filed July 1, 1959, Ser. No. 824,225
11 Claims. (Cl. 200—87)

This invention relates to electromechanical switching devices and more particularly to such devices in combination with permanent magnet control means.

In switching applications, such as are encountered, for example, in telephone systems, it is necessary to provide interconnecting facilities which are rugged, reliable and economical. An element which satisfies these requirements is the electromechanical switch or relay. However, with the advent of high speed electronic devices, the further requirement of high speed performance is placed upon the relay in order to keep pace with the balance of the telephone system operation.

Normal relay operation is realized by energizing a coil on the relay which in turn establishes a magnetic field that operates the relay contacts. Removal of the source of energy from the coil permits the magnetic field to collapse and the relay contacts to be restored to normal. In practice the electromagnetic field may be established in a small fraction of a millisecond. The relay contacts on the other hand, require a significantly longer time to respond. Even though the contacts, once operated, may be held closed by other means such as mechanical or magnetic latching arrangements, the electromagnetic field must be maintained until the relay is operated.

As the operation of the relay contacts is slow relative to the speed of operation of electronic components, systems employing such relays in particular areas, such as the subscriber line interconnections in a telephone system, necessarily are limited in overall speed of operation by the response time of the relay. As a result considerable effort has been expended in a search for devices which perform equivalent switching functions in a sufficiently short response time to be compatible with electronic control equipment. In general, such devices which possess all of the desirable characteristics of the relay are not available.

One solution to this problem is disclosed in copending application Serial No. 824,222, filed July 1, 1959 of A. Feiner, C. A. Lovell, T. N. Lowry and P. G. Ridinger. Devices disclosed therein render the relatively slow response mechanical switch itself compatible with electronic control signals. This compatibility is achieved by the combination of a bistable remanently magnetic element with a magnetically responsive switch. The bistable element is pulsed by electronic control signals and assumes a corresponding remanent magnetic condition. Thereafter, in its normal response time, the associated switch responds to this remanent magnetic condition. Thus, in a telephone system employing such devices, electronic control equipment is not tied up by the necessity of maintaining the magnetic field of the relay until its switch contacts operate.

The instant invention provides a similar solution to the problem. Thus it is an object of this invention to provide an improved mechanical switch.

More particularly, it is an object of this invention to provide a magnetically responsive switch controllable by electronic pulses.

A further object of this invention is to provide a magnetically biased mechanical switch which is controllable by pulses of duration less than the response time of the switch.

These and other objects of this invention are achieved in one specific embodiment thereof which combines a magnetically responsible reed switch of the type described in "Development of Reed Switches and Reed Relays" by O. M. Hovgaard et al., vol. 34 of the Bell System Technical Journal, page 309 ff., with a permanent magnet and a bistable magnetic member of a material exhibiting two remanent magnetization states. An advantage of the reed switch which renders it suitable for use in the instant invention is its ability to respond to relatively weak magnetic fields. The reed switch, being hermetically sealed, also exhibits good contact stability and further possesses a relatively short response time in comparison with mechanical switches in general.

The permanent magnet employed in this invention is designed to exhibit a high magnetic retentivity. That is, it is composed of a material exhibiting this characteristic and treated, as known in the art, to maintain a stable remanent magnetization indefinitely. On the other hand, the bistable magnetic member of this invention is composed of a material which exhibits magnetic retentivity but which may be switched by the application of a suitable magnetic field to one or another of a plurality of remanent magnetization states. The so-called square loop materials, of which the ferrites are a class, possess these characteristics. Accordingly, one specific embodiment of this invention includes a ferrite as the material of the bistable magnetic member.

In this specific embodiment the permanent magnet and the bistable magnetic member are positioned adjacent the switch and substantially along an extension of the switch axis so that the magnetizing force produced by the magnetic member in one remanent state reinforces the magnetic field of the permanent magnet while the magnetizing force produced in the other such state effectively cancels this field. In the former case, the switch contacts are held closed by the field of the permanent magnet reinforced by the magnetization of the magnetic member; in the latter case, the switch contacts release because of the field cancellation.

A second specific embodiment of this invention includes a reed switch of the type described above, a permanent magnet and a ferrite member having a control winding. The ferrite member and the permanent magnet are positioned adjacent the respective terminals of the reed switch and substantially at right angles to the switch axis so as to provide a shorter path for magnetic flux than is permitted in the first embodiment of the invention. Connected to the ends of the ferrite member and the permanent magnet remote from the switch terminals is a piece of magnetically permeable material such as soft iron to complete a magnetic circuit. Operation of this specific embodiment is similar to that described above, but increased sensitivity of the devices is afforded by the provision of a low reluctance path for magnetic flux in place of the longer paths through air in the specific embodiment of the invention described above.

A variation of this embodiment substitutes a second reed switch for the piece of magnetically permeable material connecting the ends of the ferrite member and the permanent magnet thus completing the magnetic circuit while affording concurrent control of two separate switch contact pairs.

It is a feature of this invention that a switching arrangement comprise a magnetic circuit including a relay, a remanently magnetic member and a permanent magnet.

It is a feature in accordance with one specific embodiment of this invention that the magnetic circuit include a permeable magnetic member connected between the permanent magnet and the remanently magnetic member.

It is another feature in accordance with one specific embodiment of this invention that the magnetic circuit comprise a pair of relays connected at their respective terminals to opposite sides of the permanent magnet and the remanently magnetic member.

Another feature of this invention is the utilization of the resultant field of a permanent magnet and one remanent magnetization state of a bistable magnetic member to close the contacts of a magnetically responsive switch and of the resultant field of the permanent magnet and the other remanent magnetization state of the bistable magnetic member to open the contacts of the switch.

More generally, it is a feature of this invention that the contacts of a magnetically responsive switch be actuated under control of the magnetic field established in a permanent magnet as reinforced or cancelled by the magnetic field selectively established in a bistable magnetic member.

A complete understanding of this invention and of these and other features thereof, may be gained from the following detailed description when read in connection with the accompanying drawing in which.

Figure 1:
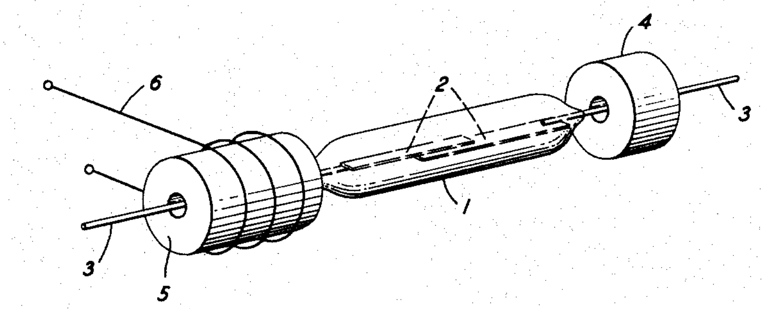
FIG. 1 depicts a view of one specific embodiment of the invention.

In FIG. 1 a reed switch 1 is shown having a pair of contact members or reeds 2 attached to opposite terminals 3. A bead-shaped member 4 of a permanently magnetic material is arranged on one of the terminals 3 while a similar bead-shaped member 5 of a different magnetic material exhibiting two stable remanent magnetization states is mounted around the other terminal 3. A conductor 6 is wound on the remanently magnetic member 5.

Figure 2:
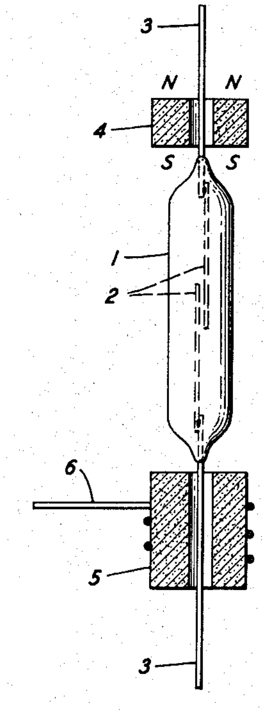
FIG. 2 is another view of the specific embodiment of FIG. 1 with portions thereof depicted in cross section.

FIG. 2 represents the same arrangement with the permanent magnet 4 and the bistable magnetic member 5 shown in cross section. The magnetic polarity of the permanent magnet 4 is indicated.

Current pulses are applied to the winding 6 in order to establish a particular remanent magnetization state in the bistable magnetic member 5. The established remanent magnetization of the member 5 either aids or opposes the indicated magnetic field of the permanent magnet 4. When the remanent magnetization of the member 5 is such that it tends to produce a north magnetic pole at the upper end of the member 5 (see FIG. 2), the field of the permanent magnet is reinforced. This drives a maximum magnetic flux through the reeds 2 and sets them in the closed position. When the remanent magnetization of the member 5 is established so as to produce a south magnetic pole at the upper end of the member 5, the resultant magnetic field opposes the field established by the permanent magnet 4 and is of sufficient strength to eliminate substantially all of the magnetic flux which was formerly directed through the reeds 2. The contacts then release under the tension of their cantilevered suspending members.

In FIG. 2 the reeds 2 are shown in the released position corresponding to a polarity of the bistable magnetic member 5 which produces a south magnetic pole at the upper end and a north magnetic pole at the lower end thereof. The respective remanent magnetization states of the bistable magnetic member 5 are established by current pulses of proper polarity applied to the winding 6. These pulses need only be sufficient in duration to establish the desired state of the bistable magnetic member 5. For most ferrites this response time may be of the order of a few microseconds. Thereafter the established remanent magnetization state of the bistable magnetic member 5 causes the reeds 2 to respond as described above. For a reed switch the response time is of the order of milliseconds. Thus is can be seen that this invention provides the highly desirable compatibility between electronic switching pulses and a magnetically responsive switch in a simple and effective arrangement. Furthermore, because of the disparity in the response times of the bistable magnetic member 5 and the reed switch 1, the magnetization state of the member 5 may be reversed a number of times, if desired, before the contact members 2 respond to the final magnetization state of the member 5.

Figure 3:
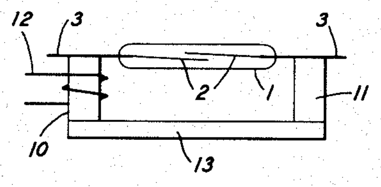
FIG. 3 is a view of a second specific embodiment of the invention.

FIG. 3 depicts a second specific embodiment of the invention. In this figure, a switch 1 having a pair of reed contacts 2 of a magnetic material and a pair of terminals 3 is shown connected to a ferrite member 10 and a permanent magnet 11. A winding 12 is wound about the ferrite member 10 to control the remanent magnetization of the member 10 in accordance with the direction of current applied to the winding 12. Between the ferrite member 10 and the permanent magnet 11 remote from the switch 1, is a rod 13 of a magnetically permeable material providing a low reluctance path for magnetic flux.

In accordance with an aspect of the invention the specific embodiment thereof depicted in FIG. 3 advantageously attains an improved operation by providing a shortened path for magnetic flux and further by providing in a portion of this path the low reluctance material of the rod 13. This improves the sensitivity of the inventive structure by increasing the strength of the combined magnetic fields of the ferrite member 10 and the permanent magnet 11 for operating the reed switch 1.

Figure 4:
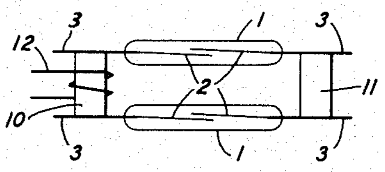
FIG. 4 depicts a variation of the specific embodiment of the invention shown in FIG. 3.

FIG. 4 depicts a variation of the specific embodiment of the invention which is depicted in FIG. 3 in that a second reed switch is substituted for the member 13 and is controlled concurrently with the first reed switch. The portions of the structure depicted in FIG. 4 which are the same as shown in FIG. 3 bear the same numerical designations. The structure of the embodiment as depicted in FIG. 4 is symmetrical; accordingly the two reed switches 1 are controlled concurrently. Both switches 1 are enabled when the remanent magnetization state of the member 10 establishes a field directed so as to reinforce the field of the permanent magnet 11. Similarly the switches 1 are released when the member 10 is in the opposite state of remanent magnetization. Suitable insulating means, not shown, is provided to keep the respective terminals 3 of the two switches 1 electrically isolated.

It is to be understood that the above-described arrangements are illustrative of the principles of the invention. Numerous other arrangements may be devised by those skilled in the art without departing from the spirit and scope of the invention.

What is claimed is:

1. An electrical switching device comprising a magnetically responsive switch having oppositely disposed terminals, means adjacent one terminal of said switch comprising a magnetic member of a material exhibiting two stable remanent magnetization conditions for producing a selected one of first and second oppositely directed magnetic fields in said switch, and a permanent magnet positioned adjacent another terminal of said switch so that the field of said permanent magnet reinforces said first magnetic field and substantially cancels said second oppositely directed magnetic field in said switch.

2. An electrical switching device in accordance with claim 1 wherein said permanent magnet comprises a first member encircling said other terminal of said switch and said magnetic member comprises a second member encircling said one terminal of said switch.

3. An electrical switching device in accordance with claim 2 wherein said means adjacent said one terminal of said switch for producing said first and second magnetic fields further comprises a current conducting winding on said second member.

4. An electrical switching device in accordance with claim 1 wherein said magnetic member is attached to said switch remote from said permanent magnet, and further comprising magnetically permeable means connecting the ends of said magnetic member and said permanent magnet remote from said switch, said magnetically responsive switch and said magnetically permeable means being included in a closed flux path also including said magnetic member and said permanent magnet.

5. An electrical switching device in accordance with claim 4 wherein said magnetically permeable means comprises a second magnetically responsive switch also included in said closed flux path.

6. An electrical switching device comprising a magnetically responsive switch having a pair of contacts, a hermetically sealed envelope enclosing said contacts, and a pair of terminals attached to said contacts and extending outside said envelope; a permanent magnet adjacent said switch for applying a first magnetic field tending to hold said switch contacts in a predetermined position; a magnetic member of a material exhibiting two stable remanent magnetization states positioned relative to said switch and said permanent magnet so that the magnetic field produced by said magnetic member in one of said remanent magnetization states substantially cancels said first magnetic field at said switch; and a winding on said magnetic member energizable for establishing one or the other of said two stable remanent magnetization states.

7. An electrical switching device comprising a reed switch having terminals at opposite ends thereof and a pair of contacts connected to said terminals, a first magnetic member of a permanently magnetic material adjacent one of said terminals, a second magnetic member of a magnetic material exhibiting two stable remanent magnetization states adjacent the other of said terminals, said reed switch completing a first flux path between said first magnetic member and said second magnetic member, and a winding coupled to said second magnetic member energizable for establishing one of said stable remanent magnetization states in said second magnetic member to oppose the flux of said first magnetic member and open said switch contacts, said winding also being energizable for establishing the other of said magnetization states in said second magnetic member to reinforce the flux of said permanent magnet and close said switch contacts.

8. An electrical switching device in accordance with claim 7 and further comprising magnetically permeable means connecting said first and second magnetic members, said magnetically permeable means completing a second flux path between said last-mentioned members.

9. An electrical switching device in accordance with claim 8 wherein said magnetically permeable means comprises an additional reed switch in said second flux path.

10. A switching device comprising a first magnet of permanent magnetic material, a second magnet of a material exhibiting more than one stable state of remanent magnetization, a relay positioned in the magnetic fields established by said first and second magnets, and means for actuating said relay comprising means for changing the stable state of remanent magnetization of said second magnet whereby the magnetic field of said second magnet selectively aids or opposes the magnetic field of said first magnet.

11. An electrical switching device comprising a magnetically responsive switch, a permanent magnet, and a magnetic member of a material exhibiting a plurality of stable remanent magnetization states positioned in a common magnetic circuit, and means for actuating said switch in one discrete time interval comprising means for establishing a predetermined one of said magnetization states of said magnetic member in a preceding discrete time interval.

References Cited in the file of this patent

UNITED STATES PATENTS

| | | |
|---|---|---|
| 2,378,986 | Dickten | June 26, 1945 |
| 2,907,846 | Wilhelm | Oct. 6, 1959 |